(12) United States Patent
Thompson

(10) Patent No.: US 7,275,864 B1
(45) Date of Patent: Oct. 2, 2007

(54) WIRELESS, SOLAR-POWERED, PAVEMENT TEMPERATURE SENSOR

(76) Inventor: Gregory E. Thompson, 3830 Rustic Pl., St. Paul, MN (US) 55126

( * ) Notice: Subject to any disclaimer, the term of this patent is extended or adjusted under 35 U.S.C. 154(b) by 92 days.

(21) Appl. No.: 11/372,722

(22) Filed: Mar. 10, 2006

(51) Int. Cl.
*G01K 1/02* (2006.01)
*G01K 1/14* (2006.01)
*G01K 13/00* (2006.01)
*G01J 5/20* (2006.01)
*G08C 19/02* (2006.01)

(52) U.S. Cl. ............... 374/120; 374/141; 374/132; 374/208; 374/16; 340/870.17; 73/146

(58) Field of Classification Search .................. None
See application file for complete search history.

(56) References Cited

U.S. PATENT DOCUMENTS

| | | | |
|---|---|---|---|
| 3,891,979 A | 6/1975 | Braun et al. | |
| 4,422,778 A * | 12/1983 | Shestopalov et al. | 374/135 |
| 4,910,498 A * | 3/1990 | Feher | 340/556 |
| 5,771,484 A | 6/1998 | Tognazzini | |
| 5,920,827 A | 7/1999 | Baer et al. | |
| 6,300,871 B1 | 10/2001 | Irwin et al. | |
| 6,317,639 B1 | 11/2001 | Hansen | |
| 6,695,469 B2 | 2/2004 | Leonhardt | |
| 6,796,187 B2 * | 9/2004 | Srinivasan et al. | 73/784 |
| 6,987,457 B2 | 1/2006 | Yin et al. | |
| 7,034,660 B2 * | 4/2006 | Watters et al. | 340/10.41 |
| 7,090,392 B2 * | 8/2006 | Leonhardt | 374/25 |
| 2002/0177942 A1 | 11/2002 | Knaian et al. | |
| 2004/0004554 A1 * | 1/2004 | Srinivasan et al. | 340/870.01 |
| 2004/0240511 A1 * | 12/2004 | Yin et al. | 374/16 |
| 2005/0008061 A1 | 1/2005 | Kaneko | |

* cited by examiner

*Primary Examiner*—Gail Verbitsky
(74) *Attorney, Agent, or Firm*—Thomas J. Nikolai; Nikolai & Mersereau, P.A.

(57) ABSTRACT

An improved roadway temperature monitoring system is designed to be powered by solar energy for measuring and transmitting sensed roadway surface temperatures over a wireless link to remote workstations comprises a module housing fabricated from a light-transmissive, thermally conductive tough plastic for containing a solar cell array, a microprocessor, a spread spectrum RF transmitter, a plurality of temperature sensing elements and a battery supply therefor whose charge is maintained by the solar cell array.

10 Claims, 3 Drawing Sheets

WIRELESS, SOLAR-POWERED, PAVEMENT TEMPERATURE SENSOR

BACKGROUND OF THE INVENTION

I. Field of the Invention

This invention relates generally to temperature telemetering apparatus, and more particularly to an electronics module adapted for placement in an opening drilled into the surface of a pavement for sensing pavement surface temperature and telemetering temperature readings to a remote receiver whereby a determination can be made whether to apply anti-icing chemicals to the roadway.

II. Discussion of the Prior Art

In U.S. Pat. No. 6,695,469 to Leonhardt and assigned to Energy Absorption Systems, Inc., there is described a roadway freezing-point monitoring system including a module adapted to be inserted into a opening drilled in the roadway pavement surface such that the top surface of the module is flush with the roadway surface. Contained within the module is a thermal-couple temperature sensor, a random access memory, a read-only memory and a memory controller. The memories and memory controller receive power over a pair of wires in the cable 18. Cable 18 also includes a conductor over which digital data may be sent to an external roadside base station. Several such modules may be coupled via hard wire connections to the base station which, in turn, is coupled via a network to a remote computer.

The system described in the Leonhardt '469 patent is operative to provide information to personnel at a remote site of the need, if any, for applying freezing point reducing chemicals to the roadway surface at particular locations to avoid formation of ice on the roadway surface.

The modules described in the prior art Leonhardt '469 patent suffer from the fact that a trench must be dug through the concrete or asphalt road surface to accommodate the cable over which electrical power is brought to the module from a roadside source and over which digital data from the module to the roadside base station is transmitted. The trench must later be filled with patching cement or asphalt and this greatly increases the installation cost. Moreover, if plural modules are disposed in the roadway to monitor temperature in multiple lanes, it can adversely affect the integrity of the road surface leading to break up due to ingress of moisture and subsequent freezing and thawing action.

Another feature that is advantageous in a roadway temperature sensing module is the ability to determine whether the surface of the roadway is being heated from above, i.e., from the sun, or is being heated from below, i.e., via the road bed.

This knowledge assists in the determination of what type of anti-icing/de-icing treatment to employ and provides guidance on the timing and location of the treatment. For example, if the sun is shining, the road surface is being warmed from the sun, and the forecast is for a nighttime air temperature just below freezing; a suitable treatment would be to treat the roadway before sundown, knowing that the sun and anti-icing/de-icing agent will work together to melt the ice or remove the ice from the road surface. However, if the sun is shining, the road surface is being warmed from the ground, and the forecast is for a nighttime air temperature just below freezing; it may be best to not treat the road at all or to delay treatment until early morning, knowing that the ground will assist in keeping the roadway surface free from ice.

It is accordingly a principal object of the present invention to provide an improved roadway temperature sensing module.

Another object of the invention is to provide a self-contained roadway temperature sensing module that does not require operating power from a roadside location proximate the module.

Yet another object of the invention is to provide a roadway temperature sensing module capable of telemetering temperature data from one or more sensing elements in the module to a remote receiver station via wireless transmission.

Still another object of the present invention is to provide a module adapted to be embedded in a roadway and that provides multiple temperature sensing elements therein whereby the direction of heating of the roadway surface can be determined.

SUMMARY OF THE INVENTION

These and other objects and advantages of the invention are achieved by providing a self-contained roadway temperature monitoring module that comprises a housing made of a block of light-transmissive material and having a top surface, a bottom surface and a side surface of a predetermined height dimension. Formed in the bottom surface is a cavity in which is disposed a solar cell array positioned proximate the top surface for providing an electrical potential at a pair of output terminals. Located beneath the solar cell array is a microprocessor chip. The microprocessor chip has a plurality of data input terminals. Also located within the cavity in the housing and coupled to receive output signals from the microprocessor is a RF transmitter. The output terminals of the solar cell array are appropriately electrically coupled to the microprocessor and to the RF transmitter so as to provide an operating voltage thereto. A plurality of temperature sensing elements, e.g., thermistors is embedded in the block comprising the housing proximate the side surface and at different height elevations. These temperature sensing elements are electrically coupled to the data input terminals of the microprocessor. The microprocessor is programmed to cause the RF transmitter or other wireless mode known to those skilled in the art to sequentially transmit temperature readings derived from the individual temperature sensing elements to a remotely located receiver. From there, the data can be sent over a network, e.g., the Internet to remotely located client computers coupled to the network.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 1:
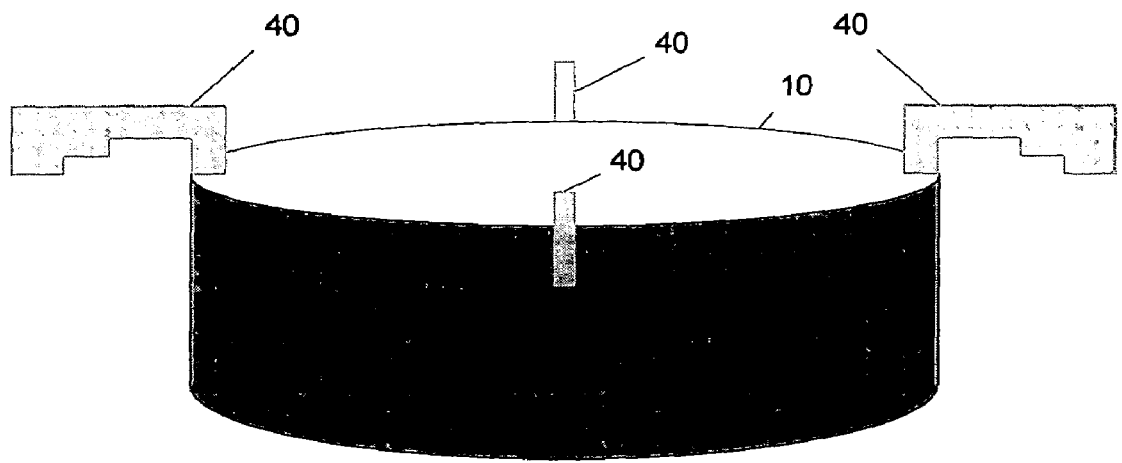
FIG. 1 is a perspective view of the wireless solar powered pavement temperature sensor module constructed in accordance with the present invention.

Referring first to FIG. 1, there is shown a perspective view of in-pavement temperature sensing module constructed in accordance with the present invention. The module is indicated generally by numeral 10 and seen to comprise a cylindrical block of a suitable plastic, such as a polycarbonate, exhibiting superior thermal conductivity properties and light energy transmittance. For example, and without limitation, the thermal conductivity of the plastic may be about 1.3 BTU-in/hr/ft$^2$/degreeF and a transmittance through $1/10^{th}$ in. thickness of the plastic of about 88%.

Figure 2:
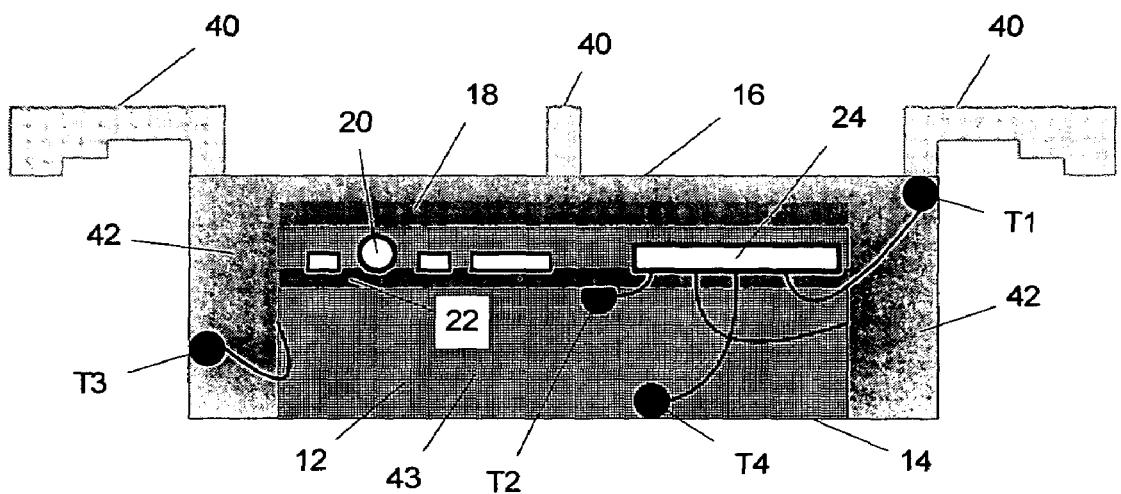
FIG. 2 is a cross-sectioned side elevation view of the module of FIG. 1 showing the location of the plural temperature sensors within the body of the module.

As shown in FIG. 2, a cavity 12 is formed inward from the base 14 of the module 10 and disposed within the cavity slightly below the top surface 16 of the module is a solar panel 18. It converts light energy into an electrical current that can be used to charge a rechargeable battery cell 20 disposed upon a printed circuit board 22 placed within the cavity 12. The printed circuit board 22 is disposed beneath the solar panel 18 so as not to obstruct passage of light through the top surface 16 of the module from reaching the solar panel 18.

Also mounted on the printed circuit board 22 are a microprocessor chip 24 and its associated memory. The microprocessor 24 is used to control a spread spectrum RF wireless transmitter which may also be mounted on the printed circuit board 22.

Figure 3:
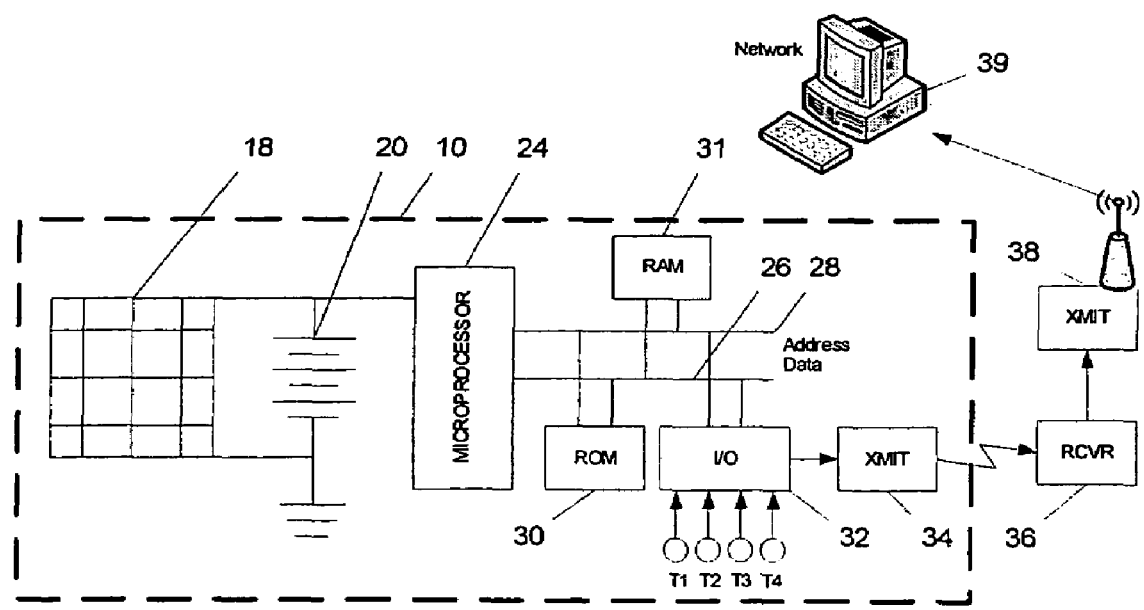
FIG. 3 is an electrical schematic diagram of the electronic devices contained within the module of FIG. 1 and remote receiver/transmitter for use therewith.

Referring momentarily to the schematic diagram of FIG. 3, the microprocessor 24 includes an address bus 26 and a data bus 28 to which a read only memory 30 and a random access memory 31 are connected, along with an input/output interface circuit 32. The input/output interface circuit 32 receives input signals from a plurality of thermistor temperature sensing elements labeled $T_1$-$T_4$. These thermistors are physically located within the module 10 at locations proximate the sidewall 11 of the module at different height elevations measured from the base 14. The thermistor $T_1$ is located proximate the top surface 16 of the module while the thermistor $T_4$ is shown as being located proximate the base 14 of the module. Thermistors T2 and T3 are disposed at spaced apart locations between the thermistors $T_1$ and $T_4$, again proximate the outer wall of the module.

The microprocessor 24 is programmed to periodically sample a temperature reading from the thermistors $T_1$-$T_4$ and convert the analog temperature readings to a digital value which can then be stored in RAM 31 and subsequently sent to the transmitter 34. Transmitter 34 sends the data to a receiver 36 located on a pole at a roadside location within range of the transmitter 34.

The receiver 36 may feed a longer range transmitter 38 broadcasting the data to a remote workstation on a LAN, such as the Internet.

During manufacture of the module 10, it is provided with a plurality of laterally extending ears 40 that extend horizontally from posts 42 embedded in the plastic comprising the module housing. When positioning a module in a bore drilled in the roadway surface, the ears 40 support the module with the top surface 16 thereof flush with the surrounding roadway allowing backfilling of the module with suitable epoxy filler. Once such epoxy filler has cured, the ears 40 are broken off from the posts 42 leaving the module 10 in the roadway with its top surface 16 flush with the surrounding surface of the concrete or asphalt roadway surface.

During manufacture, following placement of the solar panel 18 and the printed circuit board 22 with its associated electronic components thereon within the cavity 12 in the module 10, the remaining space in the cavity 12 is filled with a suitable potting compound 43 exhibiting good thermal conductivity. The potting compound is preferably a thermally conductive epoxy, environmentally suited for extreme climates, and rough treatment from surface vehicles, temperature swings, and harsh chemicals and precludes entry of moisture into the interior of the module which could adversely affect the electrical circuitry contained therein.

Without limitation, the module may be about 4½ in. in diameter and have a height dimension of about 1¾ in. Also, without limitation, the transmitter contained within the module may be a 450 MHz spread spectrum device that constitutes a purchased component.

Figure 4:
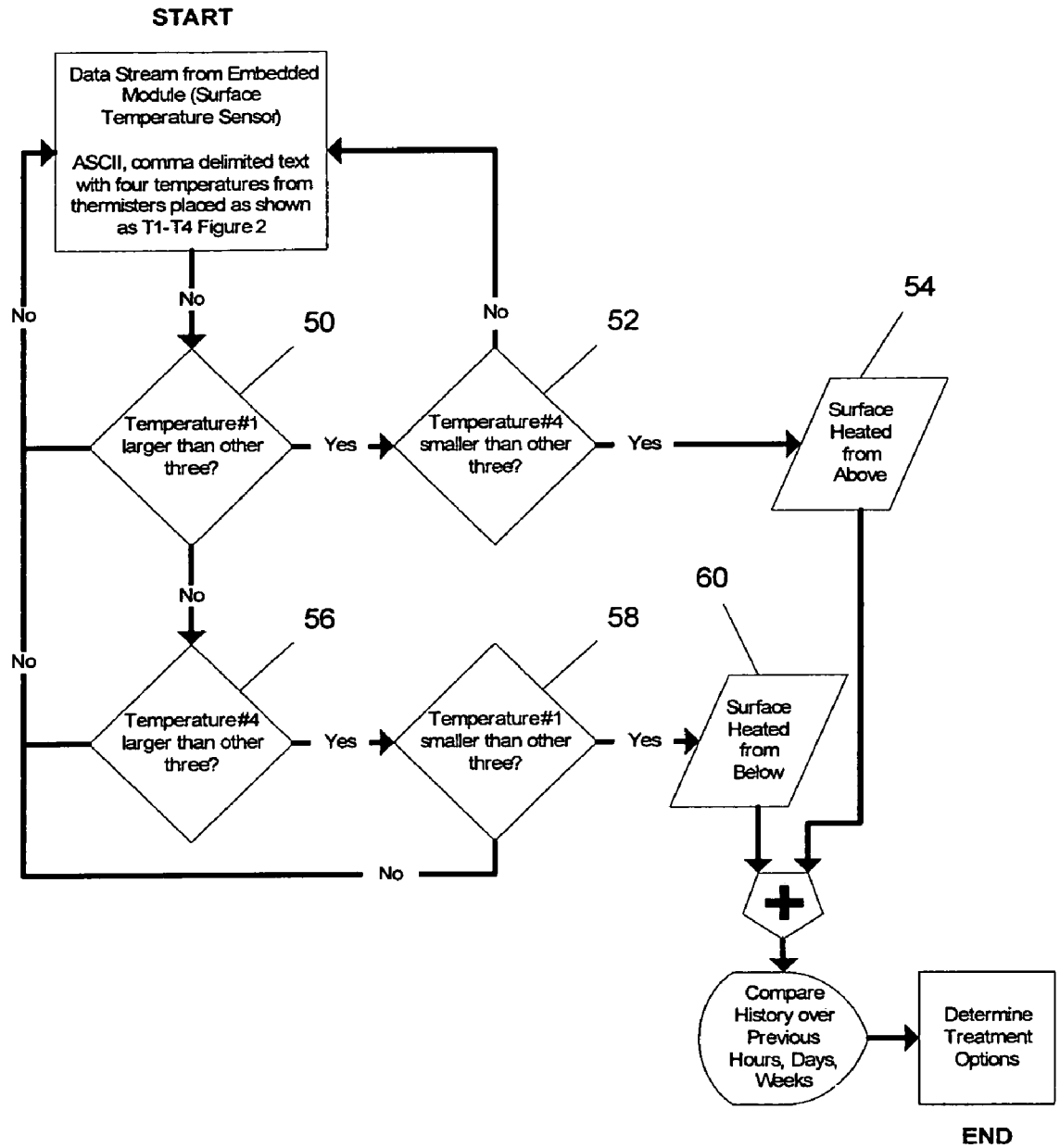
FIG. 4 is a flow diagram of the algorithm by which the direction in which roadway surface heating takes place may be computed.

FIG. 4 is a flow diagram of a software algorithm that is designed to be executed by the client workstation 39 using the temperature data derived from the several thermistor temperature sensors, $T_1$ and $T_2$, disposed in the module 10 to determine whether the road surface is being heated primarily from above, i.e., by the sun, or whether the road surface is being heated by thermal transfer from the underlying road bed. If the temperature reading from thermistor 1 is larger than the temperatures received from the other three thermistors as determined by decision block 50, a further test is made at decision block 52 whether the temperature from thermistor number 4 is smaller than the temperatures derived from the other three sensors, $T_1$-$T_3$. If so, it is known that the road surface is being heated by the sun or air from above (block 54).

Had the test at decision block 50 indicated that the temperature reading from thermistor number 1 was not larger than the other three, a further test is made at decision block 56 as to whether the temperature from thermistor number 4 is larger than the temperature reading from thermistors $T_1$-$T_3$. If it is, a further test is made at decision block 58 as to whether thermistor $T_1$ is producing a temperature reading that is smaller than that obtained from the remaining three sensors and if it is, it is then known that the road surface is being heated from below as indicated in block 60.

In either event, this knowledge derived from the analysis of the temperature readings from all four thermisters is useful to better control the timing, frequency, and amount of anti-icing/de-icing treatment for the road surface. This information, used in conjunction with other data, such as, weather information (e.g. air temperature, barometric pressure, relative humidity), type of anti-icing/de-icing agent (e.g. sodium chloride, magnesium chloride, potassium acetate), and amount of previously applied chemical, will determine the best treatment option for maintaining a safe roadway. These contributing factors and knowing the source of the roadway's surface temperature, are a major factor in the optimizing the bond necessary between the agent and the roadway maximizing the chemical's effect on breaking/melting the snow and ice on the roadway or preventing ice formation. If the road surface is warmed from ground, then treating the roadway the same for several miles is appropriate because the treating chemical is most affected by the surface temperature warmed from below. An example of better decision making from this type of information is; if the roadway surface is being warmed by the sun or the ambient air temperature and the roadway temperature varies over distance, then perhaps only the shaded from the sun areas will require treatment.

Those skilled in the art can appreciate that many modules like module 10 can be embedded at locations along a thoroughfare, on bridges, entrances and exit ramps, etc., all effectively sending temperature data to one or more workstations on the network, thereby allowing supervisory personnel to dispatch highway maintenance vehicles to those locations where an application of a freezing point reducing chemical should be applied.

The present invention provides a solar-powered pavement's temperature sensing module programmed for severe weather climates that provides wireless transmission to a roadside receiver and thereby replaces costly power and connection cables and also eliminating trenching requirements. The elimination of the trenches required by known prior art systems has been found to reduce installation costs by a factor of 10. Because of the hardened, rigidized construction, the module should survive in-pavement use over a lengthy period of time.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A self-contained roadway temperature monitoring module, comprising:
    (a) a housing comprising a block of light-transmissive material having a top surface, a bottom surface and a side surface of a predetermined height dimension, the bottom surface having a cavity formed therein;
    (b) a solar cell array disposed in the cavity proximate the top surface for producing an electrical potential at a pair of output terminals;
    (c) a microprocessor disposed in the cavity at a location between the solar cell array and the bottom surface, the microprocessor having a plurality of data input terminals;
    (d) an RF transmitter disposed in the cavity and coupled to receive output signals from the microprocessor;
    (e) means coupling the output terminals of the solar cell array to the microprocessor and to the RF transmitter; and
    (f) a plurality of temperature sensing elements embedded in said block proximate the side surface, the temperature sensing elements being electrically coupled to said data input terminals of the microprocessor.

2. The module as in claim 1 and further including a DC battery disposed in the cavity and coupled to receive a charging current from the solar cell array with the battery delivering electrical power to the microprocessor and the RF transmitter.

3. The module as in claim 1 wherein the temperature sensing elements are thermistors.

4. The module as in claim 3 wherein the thermistors are disposed at spaced-apart elevations within said predetermined height dimension.

5. The module as in claim 1 and further including a plurality of locator tabs projecting laterally from said top surface.

6. The module as in claim 5 wherein the locator tabs are removable from the top surface following placement of the module in a opening formed in the roadway, leaving the top surface of the module flush with a top surface of the roadway.

7. The module as in claim 1 wherein the microprocessor is programmed to control the transmission of sensed temperature information to a remotely located receiver by said RF transmitter.

8. The module as in any one of claims 1 to 7 wherein the cavity is hermetically sealed by a thermally conductive potting compound impervious to moisture.

9. The module as in claim 7 wherein the RF transmitter is a spread spectrum transmitter.

10. A method of detecting whether a paved road surface is being heated from above or below, comprising the steps of:
    (a) installing a temperature monitoring module of claim 4 in an opening formed in a roadway with the top surface of the housing flush with the paved road surface;
    (b) providing a transceiver at a roadside location within range of the RF transmitter;
    (c) transmitting temperature readings obtained from said temperature readings obtained from said temperature elements from the RF transmitter to the transceiver;
    (d) forwarding the temperature readings to a remote computer workstation, the computer workstation programmed to process the temperature readings from individual spaced-apart temperature sensing elements and determining from the readings the direction from which the road surface is being heated.

* * * * *